US008412795B2

(12) United States Patent
Mangano et al.

(10) Patent No.: US 8,412,795 B2
(45) Date of Patent: Apr. 2, 2013

(54) CONTROL DEVICE FOR A SYSTEM-ON-CHIP AND CORRESPONDING METHOD

(75) Inventors: Daniele Mangano, Messina (IT); Giuseppe Falconeri, Sant' Agata Li Battiati (IT); Giovanni Strani, Giarre (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 366 days.

(21) Appl. No.: 12/759,229

(22) Filed: Apr. 13, 2010

(65) Prior Publication Data
US 2010/0281144 A1   Nov. 4, 2010

(30) Foreign Application Priority Data

Apr. 29, 2009   (IT) .......................... TO2009A000337

(51) Int. Cl.
G06F 15/16   (2006.01)
G06F 15/167   (2006.01)
G06F 15/173   (2006.01)
H04L 12/28   (2006.01)
H04B 7/185   (2006.01)
H04J 3/16   (2006.01)

(52) U.S. Cl. ........ 709/217; 709/212; 709/216; 709/220; 709/225; 370/258; 370/316; 370/427; 370/438; 370/467

(58) Field of Classification Search .................. 709/213, 709/221, 225–226, 251; 370/252, 258, 316, 370/386, 427, 433, 438, 467, 468
See application file for complete search history.

(56) References Cited

U.S. PATENT DOCUMENTS

| 6,073,199 | A | 6/2000 | Cohen |
| 6,473,817 | B1* | 10/2002 | Jeddeloh ........................ 710/113 |
| 6,535,939 | B1* | 3/2003 | Arimilli et al. ................ 710/116 |
| 6,581,115 | B1* | 6/2003 | Arimilli et al. ................ 710/107 |
| 2003/0137988 | A1 | 7/2003 | Ens |
| 2003/0140131 | A1* | 7/2003 | Chandrashekhar et al. .. 709/223 |
| 2004/0030797 | A1* | 2/2004 | Akinlar et al. ................ 709/232 |
| 2006/0013229 | A1 | 1/2006 | Johansson |
| 2006/0129727 | A1* | 6/2006 | Park ................................ 710/107 |
| 2007/0094410 | A1* | 4/2007 | Voigt et al. .................... 709/237 |
| 2008/0114913 | A1* | 5/2008 | Borkenhagen et al. ....... 710/107 |
| 2009/0022493 | A1* | 1/2009 | Lu .................................... 398/58 |

OTHER PUBLICATIONS

IT Patent Appl. No. TO20090337, Written Opinion, Dec. 9, 2009, pp. 1-7.

* cited by examiner

*Primary Examiner* — David Lazaro
*Assistant Examiner* — Farzana Huq
(74) *Attorney, Agent, or Firm* — Hogan Lovells US LLP

(57) ABSTRACT

A system such as a "System-on-Chip" includes an interconnection network, a set of initiator modules for transmitting data towards the interconnection network and at least one communication arbiter for deciding, as a function of a set of configuration values, which transmissions of the initiator modules have access to the interconnection network. At least one configuration value is associated with each initiator module. A control device coupled to at least one of the initiator modules detects a communication status associated with the transmissions of the coupled initiator and generates a communication status signal whose value is representative of such status, determines a filtered value representative of a series of the values of the communication status signal, and selectively varies one of the configuration values as a function of the filtered value.

21 Claims, 4 Drawing Sheets

CONTROL DEVICE FOR A SYSTEM-ON-CHIP AND CORRESPONDING METHOD

RELATED APPLICATION

The present application claims priority of Italian Patent Application No. TO2009A000337 filed Apr. 29, 2009, which is incorporated herein in its entirety by this reference.

FIELD OF THE INVENTION

The disclosure refers to communication control devices such as the so-called Systems-on-Chip (SoC). More particularly, the present invention has particular utility for use in estimating and controlling the bandwidth of transmissions within an SoC.

DESCRIPTION OF THE RELATED ART

Nowadays, System-on-Chip (SoC) technology allows for development of even the most complex systems for communication between various modules of an integrated circuit (e.g., processing unit, memories, peripherals and other dedicated units) to ensure they meet specific performance requirements of the system.

Some applications implemented through an SoC may be subjected to specific conditions in terms of bandwidth and the interconnection network must be capable of a given Quality-of-Service (QoS) to, for example, guarantee a minimum bandwidth value in communication between modules, even with modules possibly having different requirements with respect to each other.

Currently, management of the bandwidth of various modules of an SoC is based on static techniques for the division of the bandwidths, i.e., techniques that imply prior knowledge of the characteristics of the applications themselves, which do not provide for any self-adjustment mechanism.

SUMMARY OF THE INVENTION

The inventors observed that static management of the bandwidth has various disadvantages capable of reducing the performance of a system such as an SoC. Thus, the object of the invention is providing a solution for detecting (i.e., measuring or estimating) within the SoC the bandwidths used by the various modules in such a manner to allow a dynamic management of the bandwidths.

According to one aspect of the invention, such object is achieved with a device having the characteristics referred to in the claims that follow. The invention also refers to a corresponding method, with the claims forming an integral part of the technical disclosure provided herein in relation to the invention.

The solution described herein allows measuring the bandwidths directly inside an integrated circuit thus also allowing a dynamic control of such bandwidths.

Though developed for a direct application in a System-on-Chip, the solution described herein is generally suitable for any application that requires measuring the bandwidth of communications between at least two modules.

In particular, the solution described herein is suitable for possible use to support an efficient Quality-of-Service (QoS) system measuring and controlling the bandwidth, and also, for example, in highly-distributed interconnection solutions where meeting performance requirements may be particularly difficult and even impossible using static management systems.

Hence, the solution described herein may be applied, for example, to improve performance of complex applications based on modern interconnection systems, including Bus systems (e.g., AXI or STBus Bus used in many of the circuits and designs of the assignee of the present application) or interconnection systems based on Network-on-Chip (NoC) technologies such as, for example, the ST Network-on-Chip (ST-NoC) system, also used in various products of the assignee hereof.

BRIEF DESCRIPTION OF THE DRAWINGS

Now, the invention shall be described, purely for exemplifying and non-limiting purposes, with reference to the attached representations, wherein.

DETAILED DESCRIPTION OF PREFERRED EMBODIMENTS

Illustrated in the following description are various specific details aimed at an in-depth understanding of the embodiments. The embodiments may be obtained without one or more specific details, or through other methods, components, materials etc. In other cases, known structures, materials or operations are not shown or described in detail to avoid obscuring the various aspects of the embodiments.

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

References herein are used for facilitating the reader and thus they do not define the scope of protection or the range of the embodiments.

Figure 1:
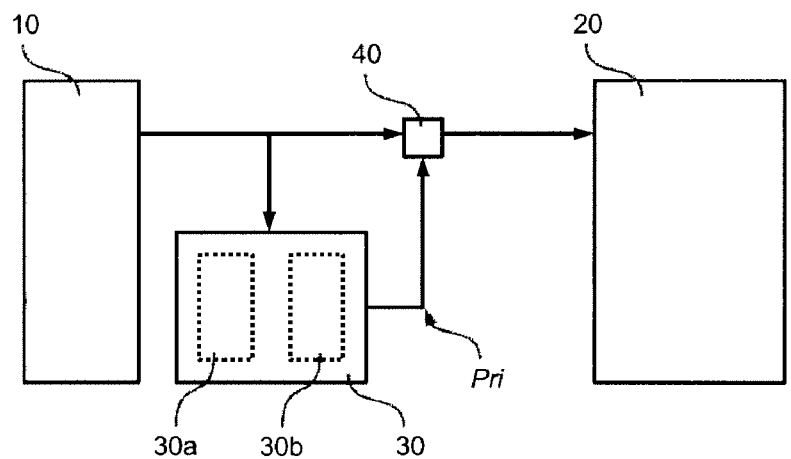
FIG. 1 is a block diagram of a possible embodiment of an SoC.

FIG. 1 shows a possible embodiment of the solution described herein capable of allowing to dynamically control the bandwidth used by a communication "initiator" 10 of a NoC (Network-on-Chip) implemented within an integrated circuit.

In particular, in this embodiment, a dynamic control of the bandwidth is carried out by modifying a priority value Pri used by a communication arbiter 40 in such a manner to decide which initiator module obtains access to the required "target" module.

In the embodiment considered in FIG. 1, the initiator 10 is a Network Interface or NI or directly a more complex module, for example an Intellectual Property (IP) core, and the initiator 10 is connected to an integrated interconnection network 20 (Integrated Computing Network or ICN), for example an NoC "network fabric", through the arbiter 40. A man skilled in the art shall observe that the arbiter 40 may also be part of the interconnection network; for example the arbiter 40 could also be implemented in the internal interconnection nodes of the NoC.

In the embodiment considered, a module 30 measures the bandwidth used by the initiator 10 and compares the measured bandwidth or MBW with the requested bandwidth or RBW.

When the measured bandwidth is lower that the requested bandwidth, the module 30 increases the priority value Pri associated to the transfer and, vice versa, when the measured bandwidth exceeds the requested bandwidth, the priority is reduced. For example, in the embodiment considered, the bandwidth is measured by means of a first sub-module 30a and priority calculation Pri is performed by a second sub-module 30b.

Instead of modifying the priority associated to the transmission, to determine which transmission has (or what transmissions have) access to the resources of the interconnection network 20, one may also modify any other parameter which influences the arbitration or which however has an effect on the band, such as, for example, the distance between the requested transactions (transaction distance). In this case, though not strictly being a parameter used directly by the arbiter, one may however intervene on the transaction distance to adjust the band.

In order to control the bandwidth, the bandwidth is measured and the priority is generated. More generally, starting from a communication status signal associated to the transmissions received from the initiator 10, a filtered output signal provided to the arbiter 40 of the interconnection network 20 is generated in such a manner to control access to the resources of the interconnection network 20.

In an embodiment, the traffic created by the initiator 10 during a given temporary interval is monitored and a mean bandwidth value is calculated. For example, in an embodiment, the bandwidth occupied by an initiator module 10 is estimated starting from a binary signal F(k) indicating a transfer from the initiator 10 to the interconnection network 20 (for example F(k)='1' if transfer occurs successfully, otherwise F(k) '0').

In an embodiment, a mean bandwidth is calculated for a time window having a fixed width (also referred to as "sliding window").

The inventors observed that the sliding window technique may be complex in terms of implementation, especially when it comes to measuring the bandwidth for a plurality of modules.

Thus, in an embodiment an alternative filter is used wherein only a brief history of the measured values is maintained and wherein the measured values are weighted.

In an embodiment, the bandwidth is estimated iteratively for a plurality of time instances (k).

In the embodiment considered, the bandwidth MBW(k) at the instance k is calculated by adding to the signal F(k) the bandwidth measured at the instance (k−1) (i.e. the previous clock cycle) multiplied by a weight (w−1) and dividing the result by w:

$$MBW(k) = \frac{MBW(k-1)\cdot(w-1) + F(k)}{w} \quad (1)$$

In this manner, the end result is a real number between 0 and 1. The coefficient w implies that the higher the value, the greater the weight of the historical value, i.e. the longer the considered history shall be.

Figure 2:
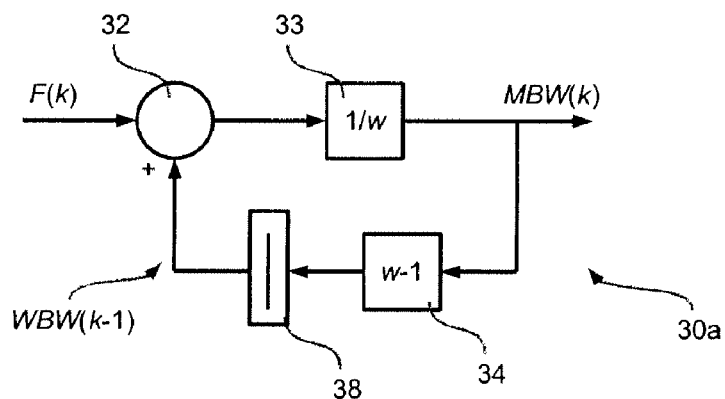
FIG. 2 is a block diagram of a first embodiment of a module for measuring bandwidth.

FIG. 2 is a block diagram of an embodiment of a corresponding filter, susceptible to be implemented within a sub-module 30a.

In the embodiment considered, a block 32, for example an adder, adds to the signal F(k) the weighted bandwidth WBW(k−1) at the instance (k−1) and the result is divided by w at a block 33 in such a manner to obtain the filtered bandwidth MBW(k). The filtered bandwidth MBW(k) is multiplied by a weight (w−1) at a block 34 and temporarily saved at a block 38 in such a manner to obtain the weighted bandwidth WBW(k−1) at the instance (k−1) at block 32.

Figure 3:
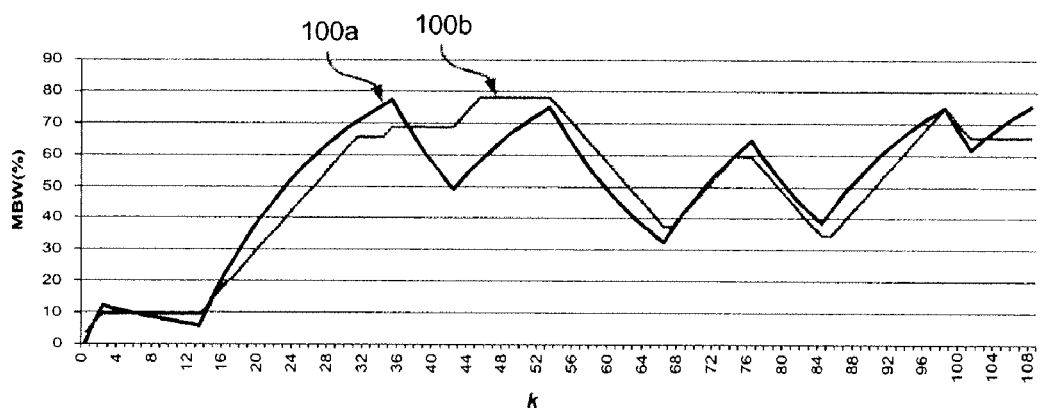
FIG. 3 is an exemplifying graphic showing the results obtained by the measuring module of FIG. 2, FIGS. 4 to 6 show details of a second embodiment of a module for measuring bandwidth.

FIG. 3 shows a graph which compares the result of the signal MBW(k) obtained through the equation (1) using for example a coefficient w=16 by means of the sliding window technique obtained using a window width of 32. In particular, the result of the equation (1) is represented by line 100a and the result of the sliding window is represented by line 100b.

In an embodiment, the equation (1) is implemented in numerical form representing the value of MBW(k) with quantized integer number with a predetermined number of bits.

In an embodiment, a normalised value $MBW_N(k)$ with respect to w is calculated.

This implies that the value of MBW(k) is represented by a number of bits equivalent to log 2(w):

$$\begin{aligned}MBW_N(k) &= w\cdot MBW(k) \quad (2)\\ &= w\frac{MBW(k-1)\cdot(w-1) + F(k)}{w}\\ &= \frac{MBW_N(k-1)\cdot(w-1)}{w} + F(k)\end{aligned}$$

Figure 4:
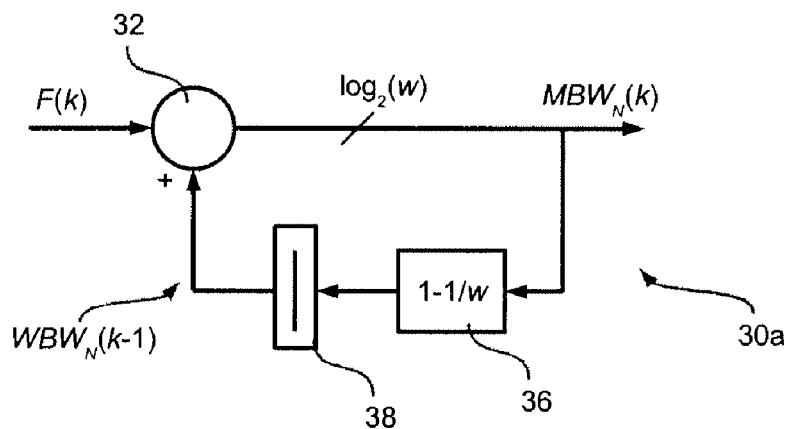

FIG. 4 is a block diagram of an embodiment of such filter which can be implemented within the sub-module 30a.

In the embodiment considered, a block 32, for example an adder, sums to the signal F(k) (encoded for example with a single bit) the weighted bandwidth $WBW_N(k-1)$ at the instance (k−1) in such a manner to directly obtain the normalized bandwidth $MBW_N(k)$. The normalized bandwidth $MBW_N(k)$ is multiplied by a weight (1−1/w) in a block 36 and temporarily saved in a block 38 so as to obtain the weighted bandwidth $WBW_N(k-1)$ at the instance (k−1) at block 32. The block 38 could be obtained for such purpose, for example, by means of data register.

One of the aspects considered herein is designing a microarchitecture efficient for block 36 i.e. for the operation (1−1/w).

Figure 5:
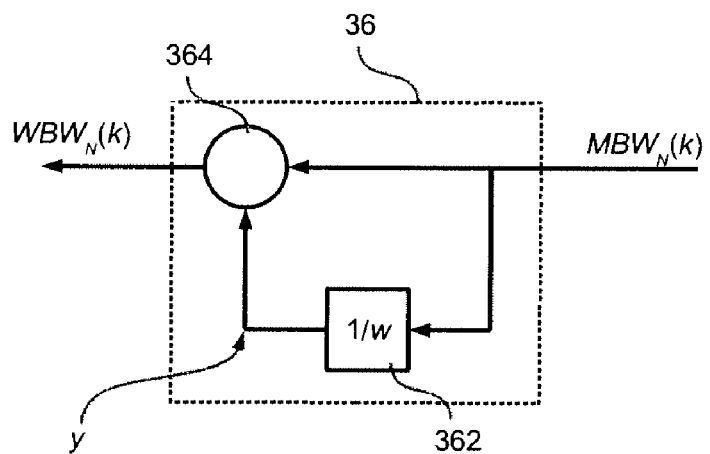

FIG. 5 shows and embodiment of block 36, provided wherein is a block 362 which divides value $MBW_N(k)$ by w, and the result of the division y is subtracted from value $MBW_N(k)$ in a block 364, for example a subtracter, in such a manner to provide the weighted bandwidth $WBW_N(k)$. This implies that value y represents a correction value which is subtracted from value $MBW_N(k)$.

At least generally, for a digital implementation within the integrated circuit, the resolution (i.e. the number of bits) of the value of $MBW_N(k)$ may be increased, for example by increasing the resolution of $MBW_N(k)$ with other log 2(w) bits and implementing the division 1/w by selecting for y the most significant log 2(w) bits of $MBW_N(k)$.

The embodiment specifically considered herein may however have advantages in terms of costs (reduction of hardware complexity).

In an embodiment, division is carried out at block 362 by approximating the division 1/w.

Figure 6:
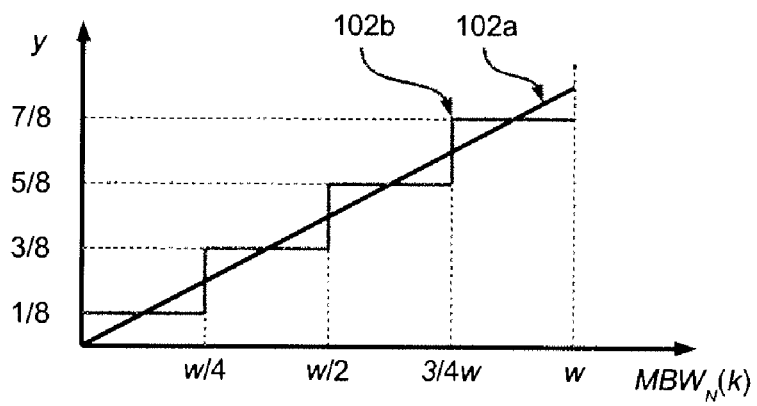

FIG. 6 shows a possible embodiment wherein the function 1/w is approximated with a step function having four different levels. In particular, line 102a represents the linear function 1/w and line 102b represents the approximated function.

For example, result y of function $1/w \cdot MBW_N(k)$ is approximated with:

⅛ if the value $MBW_N(k)$ is in the interval of [0;w/4];
⅜ if the value of $MBW_N(k)$ is in the interval of [w/4;w/2];
⅝ if the value of $MBW_N(k)$ is in the interval of [w/2;¾w]; and
⅞ if the value of $MBW_N(k)$ is in the interval of [¾w;w−1];

This implies that only an increase of the resolution of $\log_2(8)=3$ bits occurs in this case.

In an embodiment, a counter is used to obtain a correction value y instead of increasing the resolution of $MBW_N(k)$.

In an embodiment, a counter is used (for example, in the case considered herein a 3 bits counter which counts from 0 to 7 may be used) with the counter obtaining four signals L1, L2, L3 and L4 configured in such a manner that:

L1 has value 1 for 1 clock cycle out of 8;
L2 has value 1 for 3 clock cycles out of 8;
L3 has value 1 for 5 clock cycles out of 8; and
L4 has value 1 for 7 clock cycles out of 8.

For example, in this case, the signal (L1, L2, L3, or L4) associated to the interval of the current value of $MBW_N(k)$ is used as the correction signal y.

In an embodiment, during normal operation, the counter is never reset, so as to avoid losing part of the "history" hence introducing an error.

Figure 7:
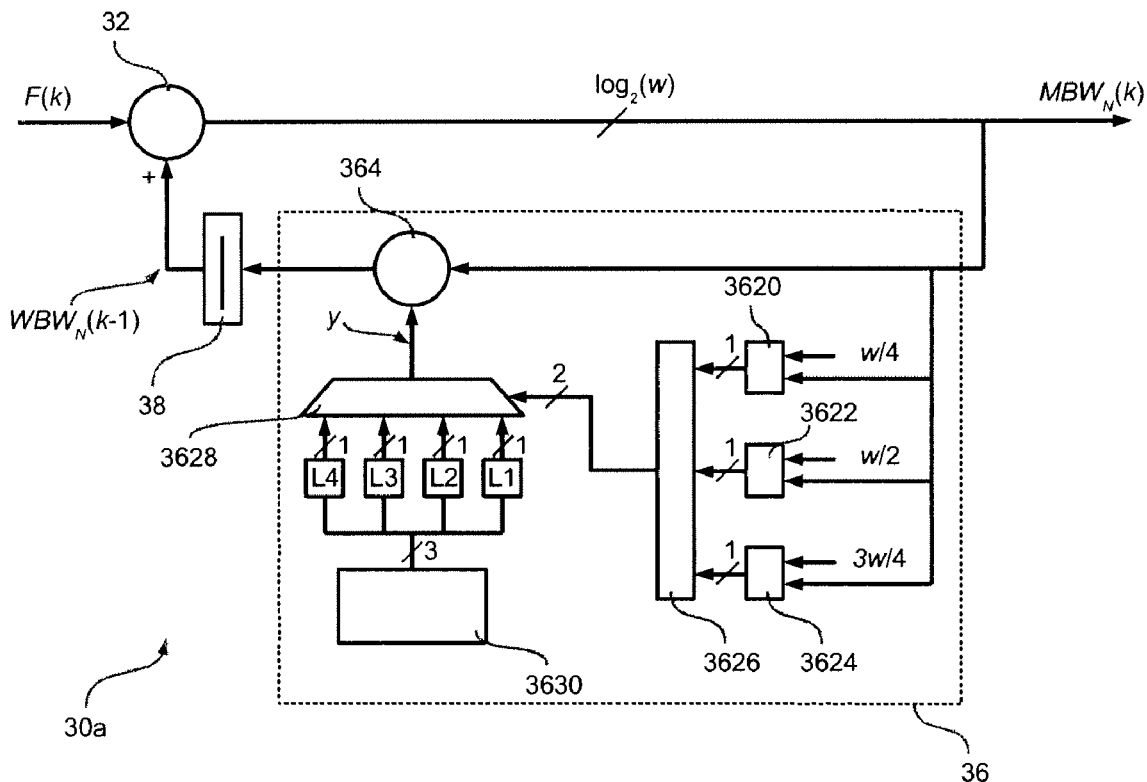
FIG. 7 is a block diagram of a third embodiment of a module for measuring bandwidth.

FIG. 7 shows a block diagram of a possible embodiment of the entire module 30a.

In the embodiment considered, the signal $MBW_N(k)$ is supplied to three comparators 3620, 3622 and 3624 which respectively determine, whether $MBW_N(k)<w/4$, $MBW_N(k)<w/2$ and $MBW_N(k)<3w/4$. The results of the comparison are supplied to a block 3626 which classifies the current value into one of the four intervals mentioned beforehand. For example, in the embodiment considered, block 3626 generates a 2-bit binary signal which identifies the interval within which the current value of $MBW_N(k)$ falls.

Blocks 3620, 3622, 3624 and 3626 may also be implemented in a single module which classifies the current value $MBW_N(k)$ into one of the four intervals. For example, should the coefficient w be static and equivalent to a multiple of 4, the selection signal could be determined by simply selecting the first 2 most significant bits of $MBW_N(k)$.

Figure 8:
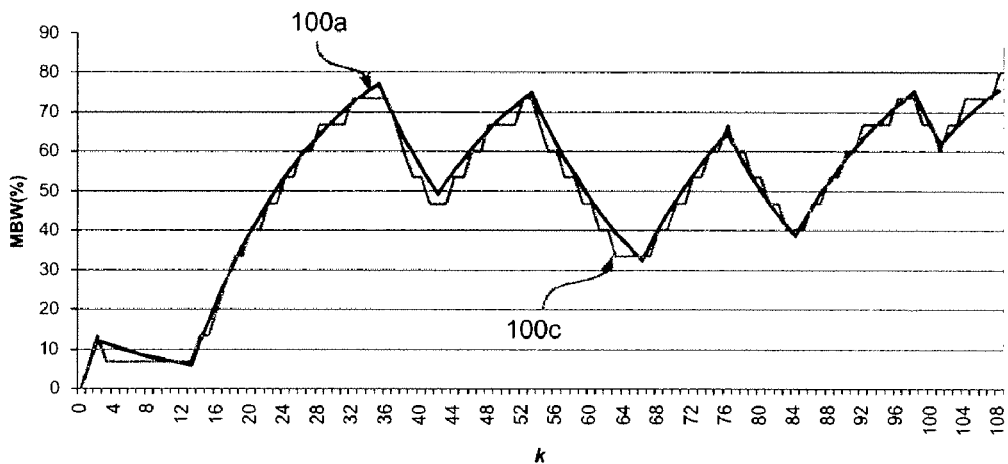
FIG. 8 is an exemplifying graph illustrating the results obtained by the measuring module of FIG. 7.

The signal that identifies the interval is used for selecting, for example by means of a multiplexer 3628, one of the four values approximated for the function 1/w. For example, in the considered embodiment, used is a 3-bit counter 3630 which counts from 0 to 7 and available in which are four signals L1, L2, L3 and L4 configured as described previously, and wherein the multiplexer 3628 is configured to select:

L1 if the value of $MBW_N(k)$ is in the interval of [0; w/4 [;
L2 if the value of $MBW_N(k)$ is in the interval of [w/4;w/2[;
L3 if the value of $MBW_N(k)$ is in the interval of [w/2;¾w[; or
L4 if the value of $MBW_N(k)$ is in the interval of [¾w;w−1];

FIG. 8 illustrates an example of a hypothetical comparison between a measurement carried out through the circuit shown in FIG. 7 and the ideal measurement carried out using the equation (1). In particular line 100a represents the result according to the equation (1) and line 100c represents the result obtained by the circuit according to FIG. 7.

A man skilled in the art shall observe that the approximation of the linear function 1/w, shown in FIGS. 6 and 7 with reference to four levels, could also be extended to n levels, using, for example, n−1 comparators and a multiplexer with n inputs, possibly using a binary counter with a different number of bits.

Module 30a may also be used to adjust the bandwidth.

Figure 9:
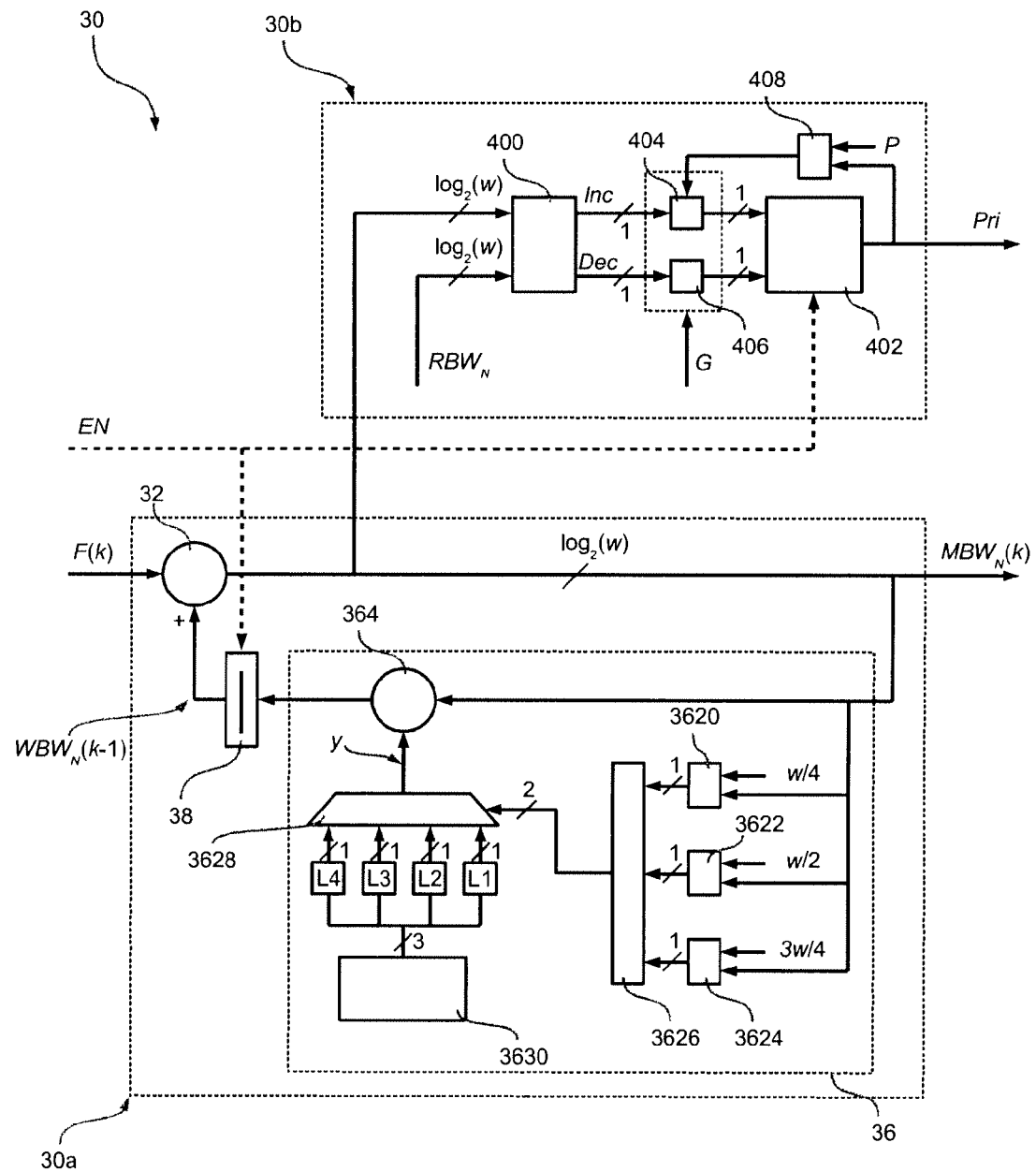
FIG. 9 is a block diagram of a possible embodiment of a control device.

FIG. 9 shows an embodiment of such control device 30, which supports, for example, the following configuration parameters:

weight of historical values w,
requested bandwidth $RBW_N$,
gain G, and
strength P.

In the considered embodiment, the priority Pri within the module 30b is adjusted by comparing the measured bandwidth $MWB_N$ and the requested bandwidth $RWB_N$, with the gain G which allows adjusting the speed of variation of the priority Pri, i.e. sensitivity to the variations of the measured bandwidth. The strength P allows setting a maximum value for the priority Pri.

The term strength is used to indicate the maximum value attainable by the priority produced by the adjuster (saturation value). Intervening on this parameter allows deciding the strength of the action of the adjuster: in case of network overload, the adjusters with lower strength are the first to be penalised, to the advantage of adjusters with higher strength.

In the embodiment considered, this mechanism is implemented through a comparator 400 which compares the measured value $MBW_N(k)$ with a requested value $RBW_N$, the $RBW_N$ being defined, for example, as:

$$RBW_N = \frac{RBW\ \%}{100} \cdot (w-1) \tag{3}$$

In the embodiment considered herein, the maximum value obtainable by MBW is (w−1): for example, in case of w=32, the MBW may acquire 32 different values, all the integers included between 0 and 31.

For example, the comparator 400 may be configured to increase the priority when $MBW_N(k) \geq RBW_N$ or, vice versa, decrease it when $MBW_N(k)<RBW_N$. For example, in the embodiment considered, two Inc and Dec signals which signal to a counter 402 whether the priority Pri should respectively increase or decreased are generated.

In the embodiment considered, a total of three counters are provided for. The first counter 402 controls the value of the priority Pri and two further optional counters 404 and 406 are used to set the gain G i.e. the speed of variation of the priority Pri.

For example, in the embodiment considered, the Inc signal enables counter 404 and the Dec signal enables counter 406. Counter 402 is subsequently increased or decreased depending on the signals generated by counters 404 and 406.

In this manner, the user may set the adjustment gain G, for example by setting:

a 100% gain: a counter is not used and there is an increase/decrease of the priority Pri each time the Inc or Dec signal is at the logic level '1';

a 50% gain: 1-bit counters are used and there is an increase/decrease of the priority Pri each time the Inc or Dec signal remains at logic level '1' for two clock cycles;

a 25% gain: 2-bit counters are used and there is an increase/decrease of the priority Pri each time the Inc or Dec signal remains at logic level '1' for four clock cycles;

12.5% gain: 3-bit counters are used and there is an increase/decrease of the priority Pri each time the Inc or Dec signal remains at logic level '1' for eight clock cycles;

and so on and so forth.

In the embodiment considered, the maximum value of the priority Pri is set by means of a comparator 408 which compares the priority currently Pri with the strength P value and should the priority reach (or exceed) the value of P the counter 404 is disabled.

In the embodiment considered, an enabling signal EN is provided which is capable of activating or deactivating the adjustment thus allowing maintaining the current adjustment conditions (i.e., for the example case, the current value of the bandwidth $MBW_N(k)$ and the value of the priority Pri). For example, deactivation of the module 30 is advisable when the initiator 10 does not generate traffic for a long period of time. For example, in the considered embodiment, the signal EN is used for activating or deactivating both the register 38 and the counter 402.

The gain G, the requested bandwidth $RBW_N$ and/or the strength P may be statistically set or may be programmed, for example by means of registers, thus allowing optimizing the adjustment according to the current application even when the integrated circuit was made.

In an embodiment, instead of referring to a communication status indicating the fact that a transmission from the initiator 10 towards interconnection network 20 is requested, reference may be made to a communication status indicating the fact that the arbiter allowed and/or denied access to the interconnection network.

In an embodiment:

if the initiator places a request and it is accepted, the adjuster is enabled (EN=1) and F(k)=1;

if the initiator places a request and it is denied, the adjuster is enabled (EN=1) and F(k)=0; and if the initiator does not place a request, the adjuster is disabled (EN=0).

Such operation is the operation provided for bandwidth adjustment and allows measuring and adjusting the band in the time intervals within which it is reasonable to do it, i.e. when the initiator is active.

At least in general terms, the module 30a could substantially similarly measure the communication latency allowing obtaining a control of the QoS also in terms of latency.

Obviously, without prejudice to the principle of the invention, the details and embodiments may vary, even significantly, with respect to what has been described herein by way of non-limiting example only, without departing from the scope of the invention as defined by the annexed claims.

We claim:

1. A control device for a system comprising:
   an interconnection network;
   a set of initiator modules for transmitting data towards said interconnection network and at least one communication arbiter for deciding, as a function of a set of configuration values, what transmissions of said initiator modules have access to said interconnection network, and wherein at least one configuration value is associated with each initiator module; and
   a control module coupled to at least one of said initiator modules for detecting a communication status associated with the transmissions of the coupled initiator and generating a status signal whose value is representative of said status, determining a filtered value representative of a historical series of the values of said communication status signal, and selectively varying at least one of said configuration values as a function of said filtered value.

2. The device of claim 1, wherein said communication status signal is representative of at least one event of:
   said coupled initiator has requested a transmission to said interconnection network; and
   said arbiter has permitted and/or denied access to said interconnection network.

3. The device of claim 1, wherein said control module determines said filtered value iteratively for a plurality of time instances.

4. The device of claim 3, wherein said control module determines said filtered value by:
   determining a weighted value from said filtered value at a previous time instance, and
   determining said filtered value at the current time instance as the sum of said communication status signal and said weighted value.

5. The device of claim 4, wherein said control module determines said weighted value from said filtered value at a previous time instance by:
   determining a correction value as a function of said filtered value at a previous time instance and a predetermined coefficient; and
   subtracting said correction value from said filtered value at said previous time instance.

6. The device of claim 5, wherein said control module determines said correction value as a function of said filtered value at a previous time instance and a predetermined coefficient by:
   defining a plurality of intervals for said filtered value as a function of said predetermined coefficient;
   assigning a different correction value to each interval for said filtered value;
   selecting the interval for said filtered value being assigned to the said filtered value at said previous time instance; and
   selecting the correction value being assigned to the selected interval.

7. The device of claim 5, further comprising a counter, wherein the count value of said counter is used to determine said correction value.

8. The device of claim 1, wherein said interconnection network comprises a Network-on-Chip or a bus system.

9. The device of claim 1, wherein said set of configuration values comprises at least one of:
   the priority of the transmission; and
   the transaction distance.

10. The device of claim 1, wherein said filtered value is indicative of at least one of:
    a bandwidth used by said coupled initiator; and
    latency of the transmission of said coupled initiator.

11. The device of claim 1 being integrated in a System-on-Chip.

12. A method of controlling the operation of a system comprising:
    providing an interconnection network;
    providing a set of initiator modules for transmitting data towards said interconnection network and at least one communication arbiter for deciding, as a function of a set of configuration values, which transmissions of said initiator modules have access to said interconnection network, and wherein at least one configuration value is associated with each initiator module;

detecting a communication status associated with the transmissions of at least one initiator and generating a status signal whose value is representative of said status;

determining a filtered value representative of a series of the values of said communication status signal; and selectively varying at least one of said configuration values as a function of said filtered value.

13. A method for controlling a system comprising:

providing an interconnection network;

providing a set of initiator modules for transmitting data towards said interconnection network and at least one communication arbiter for deciding, as a function of a set of configuration values, what transmissions of said initiator modules have access to said interconnection network, and wherein at least one configuration value is associated with each initiator modules; and providing a control module coupled to at least one of said initiator modules for detecting a communication status associated with the transmissions of the coupled initiator and generating a status signal whose value is representative of said status, determining a filtered value representative of a historical series of the values of said communication status signal, and selectively varying at least one of said configuration values as a function of said filtered value.

14. The method of claim 13, wherein said communication status signal is representative for at least one event out of:

said coupled initiator has requested a transmission to said interconnection network; and said arbiter has permitted and/or denied access to said interconnection network.

15. The method of claim 13, wherein said control module determines said filtered value iteratively for a plurality of time instances.

16. The method of claim 15, wherein said control module determines said filtered value by:

determining a weighted value from said filtered value at a previous time instance, and determining said filtered value at the current time instance as the sum of said communication status signal and said weighted value.

17. The method of claim 16, wherein said control module determines said weighted value from said filtered value at a previous time instance by:

determining a correction value as a function of said filtered value at a previous time instance and a predetermined coefficient; and subtracting said correction value from said filtered value at said previous time instance.

18. The method of claim 17, wherein said control module determines said correction value as a function of said filtered value at a previous time instance and a predetermined coefficient by:

defining a plurality of intervals for said filtered value as a function of said predetermined coefficient;

assigning a different correction value to each interval for said filtered value;

selecting the interval for said filtered value being assigned to the said filtered value at said previous time instance; and selecting the correction value being assigned to the selected interval.

19. The method of claim 17, further comprising providing a counter, wherein the count value of said counter is used to determine said correction value.

20. The method of claim 13, wherein said set of configuration values comprises at least one of:

the priority of the transmission; and the transaction distance.

21. The method of claim 13, wherein said filtered value is indicative of at least one of:

a bandwidth used by said coupled initiator; and latency of the transmission of said coupled initiator.

* * * * *

UNITED STATES PATENT AND TRADEMARK OFFICE
CERTIFICATE OF CORRECTION

PATENT NO. : 8,412,795 B2  
APPLICATION NO. : 12/759229  
DATED : April 2, 2013  
INVENTOR(S) : Mangano, Falconeri and Strano Page 1 of 1

It is certified that error appears in the above-identified patent and that said Letters Patent is hereby corrected as shown below:

Title Page, item (75) Inventors: "Giovanni Strani" should be --Giovanni Strano--

Signed and Sealed this
Twenty-eighth Day of May, 2013

Teresa Stanek Rea
*Acting Director of the United States Patent and Trademark Office*